US005939220A

United States Patent [19]
Gunner et al.

[11] Patent Number: 5,939,220
[45] Date of Patent: Aug. 17, 1999

[54] CATALYST

[75] Inventors: Alec Gordon Gunner, Longfield; Timothy Ian Hyde, Reading; Robert John Potter, Chalkhouse Green; David Thompsett, Reading, all of United Kingdom

[73] Assignee: Johnson Matthey Public Limited Company, London, United Kingdom

[21] Appl. No.: 08/955,416

[22] Filed: Oct. 23, 1997

[30] Foreign Application Priority Data

Oct. 25, 1996 [GB] United Kingdom ................. 96222284

[51] Int. Cl.$^6$ ...................................................... B01J 23/40
[52] U.S. Cl. ............................ 429/40; 502/325; 502/326; 502/332; 502/334; 502/339; 502/327; 420/466; 420/467; 420/468; 204/293
[58] Field of Search ..................................... 420/466, 467, 420/468; 204/293; 429/40; 502/325, 326, 327, 332, 334, 339

[56] References Cited

U.S. PATENT DOCUMENTS

| 4,528,083 | 7/1985 | LaConti et al. ....................... 204/290 F |
| 4,677,092 | 6/1987 | Luczak et al. ........................... 502/185 |

FOREIGN PATENT DOCUMENTS

| 1 285 861 | 1/1970 | United Kingdom . |
| 1 292 791 | 1/1970 | United Kingdom . |
| 1 477 962 | 5/1975 | United Kingdom . |
| 1 507 420 | 12/1976 | United Kingdom . |
| 1 582 582 | 2/1977 | United Kingdom . |
| 2 117 791 | 3/1983 | United Kingdom . |
| 2 133 420 | 1/1984 | United Kingdom . |
| 1 238 013 | 6/1986 | United Kingdom . |
| 2 184 593 | 12/1986 | United Kingdom . |

OTHER PUBLICATIONS

K. Y. Chen et al., "Anodic Oxidation of Impure $H_2$ on Teflon–Bonded Pt–Ru/$WO_3$/C Electrodes", J. Electrochem Soc., vol. 142, No. 10, 1995, pp. L185–L187 no month available.

L. W. Niedrach et al., "Performance of Carbon Monoxide in Low–Temperature Fuel Cells Containing Oxide Catalyst", Electrochemical Technology, vol. 3, No. 9–10; 1965; pp. 270–275 no month available.

L. W. Niedrach et al., "Catalytic Enhancement of Carbon Monoxide and Reformer Gas Oxidation in Fuel Cells by Sodium Tungsten Bronzes", J. Electrochem Soc. vol. 116, No. 1, 1996, pp. 152–153, no month available.

*Primary Examiner*—Bruce F. Bell
*Attorney, Agent, or Firm*—Ratner & Prestia

[57] ABSTRACT

A novel catalyst comprising a Pt—M alloy wherein M is one or more metals selected from the transition metal elements or from Groups IIIA or IVA of the Periodic Table in "Handbook of Chemistry and Physics" 64th Edition, CRC Press, and Y wherein Y is a bronze forming element or an oxide thereof, characterised in that the Pt—M alloy is in intimate contact with Y, and provided that M is not Ru if Y is $WO_3$ is disclosed and which may be used as a poison tolerant catalyst for use in fuel cells, specifically as the anode of a PEM fuel cell.

34 Claims, 3 Drawing Sheets

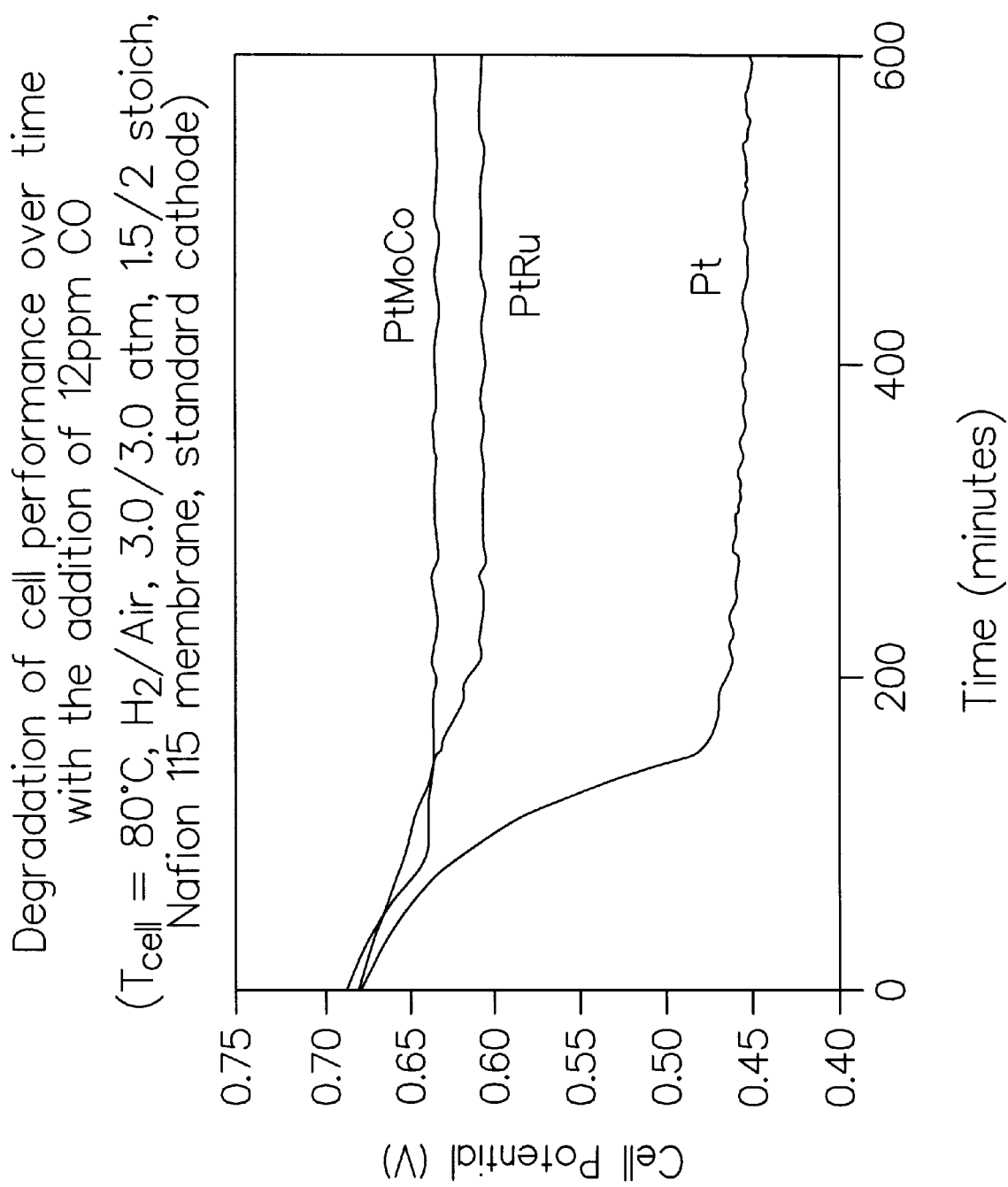

CATALYST

This invention relates to a novel catalyst and specifically to a poison tolerant catalyst for use in gas diffusion electrodes for fuel cells, particularly for proton exchange membrane fuel cells.

In a fuel cell, a fuel, which is typically hydrogen, is oxidised at a fuel electrode (anode) and oxygen, typically from air, is reduced at a cathode, to produce an electric current and form product water. An electrolyte is required which is in contact with both electrodes and which may be alkaline or acidic, liquid or solid. The liquid electrolyte phosphoric acid fuel cell (PAFC) operating at a temperature of 190° C.–200° C., is a type of fuel cell close to commercialisation and will find applications in the multi-megawatt utility power generation market and also in combined heat and power, ie co-generation systems, in the 50 to several hundred kilowatt range. In solid polymer fuel cells (SPFCs) or proton exchange membrane fuel cells (PEMFCs), the electrolyte is a solid proton-conducting polymer membrane, commonly based on perfluorosulphonic acid materials. The electrolyte must be maintained in a hydrated form during operation in order to prevent loss of ionic conduction through the electrolyte. This limits the operating temperature of the PEMFC typically to between 70° C. and 120° C. depending on the operating pressure. The PEMFC does, however, provide much higher power density output than the PAFC, and can operate efficiently at much lower temperatures. Because of this, it is envisaged that the PEMFC will find use in vehicular power generation and small scale residential power generation applications. In particular, vehicle zero emission regulations have been passed in areas of the United States which are likely to restrict the use of the combustion engine in the future. Pre-commercial PEMFC-powered buses and prototype PEMFC-powered vehicles are now being demonstrated for these applications.

Due to these relatively low temperatures, the oxidation and reduction reactions require the use of catalysts in order to proceed at useful rates. Catalysts which promote the rates of electrochemical reactions, such as oxygen reduction and hydrogen oxidation in a fuel cell, are often referred to as electrocatalysts. Precious metals, and in particular platinum, have been found to be the most efficient and stable electrocatalysts for all low temperature fuel cells, operating below 300° C. The platinum electrocatalyst is provided as very small particles (~20–50 Å) of high surface area, which are often, but not always, distributed on, and supported by, larger macroscopic conducting carbon particles to provide a desired catalyst loading. Conducting carbons are the preferred materials to support the catalyst. The electrodes include electrocatalyst material and should be designed to enhance contact between the reactant gas (ie hydrogen or oxygen), the electrolyte, and the precious metal electrocatalyst. The electrode is porous, and is often known as a gas diffusion (or gas porous) electrode, since it allows the reactant gas to enter the electrode from the face of the electrode exposed to the reactant gas stream (back face), and the electrolyte to penetrate through the face of the electrode exposed to the electrolyte (front face), and products, particularly water, to diffuse out of the electrode. In the PEMFC the electrodes are bonded to the solid polymer electrolyte, which is in the form of a thin membrane, to form a single integral unit known as the membrane electrode assembly (MEA).

In most practical fuel cell systems the hydrogen fuel is produced by converting a hydrocarbon-based fuel such as methane, or an oxygenated hydrocarbon fuel such as methanol, to hydrogen in a process known as reforming. This fuel, referred to as reformate, contains in addition to hydrogen, high levels of carbon dioxide ($CO_2$), of around 25%, and small amounts of impurities such as carbon monoxide (CO), typically at levels of around 1%. For fuel cells operating at temperatures below 200° C., and especially for the PEMFC operating at temperatures around 100° C., it is well known that CO, even at levels of 1–10 ppm, is a severe poison for the platinum electrocatalysts present in the electrodes. This leads to a significant reduction in fuel cell performance, ie the cell voltage at a given current density is reduced. This deleterious effect is more pronounced with the lower operating temperature PEMFC.

Various methods have been employed to alleviate anode CO poisoning. For example, reformer technology has been redesigned to include an additional catalytic reactor, known as a preferential or selective oxidation reactor. This involves the injection of air or oxygen into the hydrogen containing reactant gas stream prior to passing over the selective oxidation catalyst to oxidise the CO to $CO_2$. This can reduce the levels of CO from 1–2% down to below 100 ppm. However, even at these levels the anode electrocatalyst in the PEMFC is still poisoned.

It has also been found that poisoning of the electrocatalyst by CO at levels of 1–100 ppm can be reduced by the use of an oxygen or air bleed directly into the anode gas stream just before it enters the anode chamber of the fuel cell itself. This is described by S Gottesfeld and J Pafford in Journal Electrochem. Soc., Vol 135, 1988, p2651. The technique is believed to have the effect of oxidising the residual CO in the fuel to $CO_2$, the reaction being catalysed by electrocatalyst sites present in the anode:

$$CO + \tfrac{1}{2}O_2 \rightarrow CO_2 \qquad\qquad 1$$

This technique provides fuel cell performance that is much closer to the performance observed if no CO was present in the fuel stream.

However, the preferred technique for alleviating fuel cell performance reduction due to anode CO poisoning is to employ an anode electrocatalyst which is itself more poison tolerant, but which still functions as a hydrogen oxidation catalyst in the presence of CO. As described by, for example, L Niedrach et al in Electrochemical Technology, Vol. 5, 1967, p318, the use of a bimetallic anode electrocatalyst comprising platinum/ruthenium, rather than the more conventionally used mono-metallic platinum only electrocatalyst, shows a reduction in the poisoning effect of the CO at typical PEMFC operating temperatures. However, again it has not yet been possible to fully attain the performance observed on pure hydrogen, ie in the absence of CO in the fuel stream, by using this approach in isolation.

The mechanism proposed for this improvement is that the active sites on the modified electrocatalyst are less prone to poisoning by adsorption of the poisoning species and more sites are left available to perform the desired hydrogen oxidation reaction. The poisoning species can either be the CO itself present as trace levels in the reformate fuel or indeed chemically related species that can be produced from a reaction of the $CO_2$ present in the reformate with hydrogen.

From a cost point of view it is desirable to use electrodes with loadings of the precious metal electrocatalyst of lower than 1.0 mg/cm$^2$ of electrode area. At these loadings, it has not yet been possible to produce an anode electrocatalyst with high enough tolerance to poisoning, such that, when no air bleed is employed, the performance is close to that observed with hydrogen fuel with no poisoning species present.

The air bleed technique is currently being employed in PEMFCs operating on reformate fuel to provide a performance much closer to that observed if no CO or $CO_2$ was present in the fuel stream. Although it is possible to improve the performance of the PEMFC to close to the level that would be observed if no poisoning species were present, there are concerns over the long term sustainability of the cell performance when this approach is employed. This is particularly the case if high levels of air bleed, equivalent to 4% and above of the total reformate fuel volume, are required.

There has been a number of attempts to improve the performance of anode electrocatalysts operating in the presence of hydrogen fuels containing CO and $CO_2$. These have taken the approach of modifying existing state-of-the-art catalysts, such as platinum/ruthenium with other components. In 1995, Chen et al (J. Electrochem. Soc., Vol. 142, No 10) discussed the need to develop CO tolerant catalysts and studied the oxidation of impure $H_2$ on Teflon-bonded carbon supported platinum/ruthenium/tungsten oxide electrodes. The use of tungsten oxide as a promoter of improved activity of platinum catalysts towards impure $H_2$ is not new. As far back as 1965 it was known that tungsten oxides ($WO_3$) were effective in promoting the electro-oxidation of CO on platinum- containing electrodes in acid-electrolyte fuel cells (Niedrach and Weinstock, Electrochem. Technol., 3, 270–5 (1965)).

A new catalyst has now been found by the present inventors which demonstrates improved tolerance to electrode poisons over those catalysts already known. Accordingly, the present invention provides a catalyst comprising a Pt—M alloy wherein M is one or more metals selected from the transition metal elements or from Groups IIIA or IVA of the Periodic Table in "Handbook of Chemistry and Physics" 64th Edition, CRC Press, and Y wherein Y is a bronze forming element or an oxide thereof, characterised in that the Pt—M alloy is in intimate contact with Y, and provided that M is not Ru if Y is $WO_3$. Suitably, the atomic proportion of Pt as a proportion of the total metal content (Pt+M+Y) in the catalyst is 40% or more.

The Pt—M alloy is more than a mere physical mixture of Pt with metal M, since the platinum and metal M are deliberately heat treated to promote a measurable interaction between the platinum and metal M to fundamentally change the intrinsic properties of the platinum metal. Heat treatment causes a significant number of atoms of the metal M to be incorporated into the atomic crystal lattice, or unit cell, of the platinum particle. This process usually distorts the dimensions of the platinum unit cell, since the atoms of the metal M will generally be of a different size to the platinum, and this can usually be measured by techniques such as X-ray diffraction (XRD). The characteristic dimensions of the platinum unit cell, referred to by crystallographers as the lattice parameter, can be shown to have altered due to the fact that two or more metals, with different atomic sizes, have been incorporated into a single, homogeneous metal alloy particle at the atomic level.

Component Y may be a bronze forming element or an oxide thereof. A 'bronze' material is defined by Wold and Dwight in Solid State Chemistry—Synthesis, Structure, and Properties of Selected Oxides and Sulfides, Chapman & Hall as '. . . an oxide with intense colour (or black), having a metallic lustre and showing either semi-conducting or metallic behaviour. A principle characteristic of bronzes is their range of composition, which results in the transition metal exhibiting a variable formal valence.'.

By the term "intimate contact" we mean that component Y may either be alloyed with the Pt—M alloy (the resulting alloy being as defined hereinbefore) or may be unalloyed but is in physical contact with the alloy.

Preferably, the one or more metals (M) is selected from the groups IVB, VB, VIB, VIIB, VIII, IB, IIB, IIIA or IVA of the Periodic Table in "Handbook of Chemistry and Physics" 64th Edition, CRC Press; for example from the group Ru, Rh, Ti, Cr, Mn, Fe, Co, Ni, Cu, Ga, Zr, Hf and Sn; especially Ru, Mn, Co, Ni, Rh. In one specific embodiment of the invention, M is not ruthenium.

The component Y is suitably selected from one or more of the Group IVB to VIB elements and rhenium or an oxide thereof other than chromium or its oxide, for example Ti, V, Nb, Ta, Mo, W, Re or an oxide thereof; suitably Ti, V, Ta, Mo, W or an oxide thereof; preferably Mo or W or an oxide thereof.

A first alternative aspect of the present invention provides a catalyst comprising a Pt—M alloy where M is selected from one or more metals other than Ru, and wherein the Pt—M alloy is in intimate contact with Y.

A second alternative aspect of the present invention provides a catalyst comprising a Pt—M alloy where M is two or more metals wherein one of the metals is ruthenium, and wherein the Pt—M alloy is in intimate contact with Y.

A third alternative aspect of the present invention provides a catalyst comprising a Pt—Ru alloy wherein the Pt—Ru alloy is further alloyed with tungsten.

A fourth alternative aspect of the present invention provides a catalyst comprising a Pt—Ru alloy which is in intimate contact with Y wherein Y is a bronze forming element or its oxide other than tungsten or tungsten oxide.

The catalyst of the present invention shows improved tolerance to poisons whilst maintaining high activity for the desired electrochemical reaction, and is therefore of use as the electrocatalyst on either the anode or the cathode in fuel cells which use an impure feed. The catalyst may be of benefit in both phosphoric acid and solid polymer fuel cells. Specifically, it shows tolerance to poisons in reformate fuel and is therefore specifically of use as the electrocatalyst on the anode.

A further aspect of the present invention provides a process for the preparation of the catalyst of the invention, the process comprising the deposition of platinum onto a conductive carbon black substrate by the hydrolysis of a soluble platinum salt by a base in the presence of the carbon black, followed by the deposition of one or more metals (M) in a similar manner to the platinum using appropriate metal salt solutions. To this material is added a solution of Y which can be prepared in a variety of ways. The combined mixture is then isolated either by evaporation or filtration. The precise nature of this process is dependant on the particular chemistry of component Y added. The isolated material is them heat treated at an elevated temperature under an inert atmosphere to ensure intimate contact of the added components. The catalyst is then ready for fabrication into an electrode.

The catalyst of the invention may be used in the preparation of an electrode, either an anode or cathode, for use in any electrochemical device employing an electrode, for example a fuel cell, an electrolyser, a sensor. Accordingly, a yet further aspect of the present invention provides an electrode comprising a catalyst of the invention. The invention further provides the use of an electrode of the invention in an electrochemical device. Suitably, the electrochemical device is a fuel cell. Suitably, the fuel cell electrode is an anode.

The invention will now be described further with reference to the following examples.

The assay and XRD characterisation data of the catalysts of Comparative Examples 1, 2 and 3 and Examples 1 to 5 are given in Table 1.

COMPARATIVE EXAMPLE 1

A catalyst containing platinum only supported on Chevron Shawinigan Acetylene Carbon Black, such that the platinum loading is 20 wt % (of the total catalyst weight (including the carbon support)), as a typical state-of-the-art catalyst used in PEM fuel cells operating with pure hydrogen fuel, was prepared using a process comprising the deposition of Pt onto the conductive carbon black substrate by the hydrolysis of a soluble Pt salt by a base in the presence of the carbon black, as disclosed in EP 0450849.

COMPARATIVE EXAMPLE 2

A catalyst containing platinum and ruthenium supported on Cabot Vulcan XC72R carbon, such that the nominal platinum loading is 20 wt %, and the nominal ruthenium loading is 10 wt % (atomic ratio 50:50), was prepared using a similar method to that described in Comparative Example 1. This catalyst is considered as an example of a state-of-the-art catalyst for operation on impure hydrogen containing levels of CO.

COMPARATIVE EXAMPLE 3

A catalyst containing platinum, ruthenium and tungsten oxide was prepared. 7.5 g of the state-of-the-art PtRu catalyst prepared according to Comparative Example 2, at 19.2 wt %Pt and 9.1 wt %Ru loading supported on Cabot Vulcan XC72R, was slurried in 1 liter demineralised water for an hour. A 1 wt % solution of sodium tungstate in demineralised water was prepared containing 1.98 g tungsten and this was passed through an exchange column, comprising Dowex 50-X8 ion exchange resin to convert to colloidal tungstic acid, directly into the slurry. The resultant catalyst was allowed to stir overnight and then filtered, dried at 105° C. in air and fired at 500° C. in a gas mixture containing 6%CO in $CO_2$.

EXAMPLE 1

A catalyst containing platinum, cobalt and tungsten was prepared. To a stirred suspension of Cabot Vulcan XC72R carbon (32 g) in a solution of sodium hydrogen carbonate (18.5 g) under reflux, was added 5.68 g platinum as a 2 wt % solution of chloroplatinic acid sufficient to give a nominal loading of 15 wt % of platinum. The resulting slurry was filtered and washed with demineralised water, until no chloride was detectable in the washings. The catalyst was dried at 100° C. in air. The catalyst was re-slurried in hot sodium hydrogen carbonate solution and 0.40 g cobalt as a 2 wt % solution of cobaltous chloride hydrate was added dropwise. The ratio of alkali to metal salts for both steps was such to ensure complete hydrolysis and precipitation of the metal hydrous oxides/hydroxides onto the carbon. The slurry was filtered and washed with demineralised water, until no chloride was detectable in the washings. The wet cake was then dispersed in demineralised water. To this slurry was added 1.5 g tungsten in a aqueous solution. The tungsten solution was prepared by dissolving tungsten powder (1.5 g) in hydrogen peroxide (100 ml of 27M $H_2O_2$), followed by decomposition of the excess peroxide by platinum black and subsequent dilution to 1% with demineralised water. The combined slurry was then evaporated to dryness. The resulting catalyst was then heated at 900° C. in flowing nitrogen to ensure reduction and alloying of the components. X-ray diffraction analysis of the fired catalyst showed a single platinum based cubic phase with a reduced lattice parameter of 3.90 Å compared to 3.925 Å for pure platinum indicating a high level of incorporation of the Co and W components into the Pt lattice.

EXAMPLE 2

A catalyst containing platinum, cobalt and molybdenum was prepared. To a stirred suspension of Cabot Vulcan XC72R carbon (30.23 g) in a solution of sodium hydrogen carbonate under reflux, was added a mixed solution comprising 8 g platinum as a solution of chloroplatinic acid to give a nominal platinum loading of 20 wt %, and 0.56 g cobalt as a 2 wt % solution of cobaltous chloride hydrate. After refluxing for 2.5 hrs the resulting slurry was filtered and washed with demineralised water until no chloride was detectable in the washings. The catalyst was dried at 105° C. in air and then re-slurried in 1 liter of demineralized water for one hour at ambient temperature. 1.21 g molybdenum as an aqueous solution of sodium molybdate was prepared at 1 wt %, and passed through an exchange column, comprising Dowex 50-X8 ion exchange resin to convert to colloidal molybdic acid, directly into the slurry. After evaporating the combined slurry to dryness, the resulting catalyst was heated at 650° C. in flowing 5% hydrogen in nitrogen to ensure reduction and alloying of the components. X-ray diffraction analysis of the fired catalyst showed a platinum based cubic phase with a reduced average lattice parameter of 3.868 Å compared to 3.925 Å for pure platinum indicating a high level of incorporation of the Co and Mo components into the Pt lattice.

EXAMPLE 3

A catalyst containing platinum, nickel and tungsten was prepared. Cabot Vulcan XC72R carbon (14.56 g) was suspended in refluxing demineralized water (6 liters) and a stoichiometric quantity of potassium hydrogen carbonate (16.5 g) dissolved in the suspension to ensure complete hydrolysis and precipitation of the metal oxides/hydroxides onto the carbon. To the suspension was added a mixed solution comprising 4 g platinum as a 2 wt % aqueous chloroplatinic acid solution, sufficient to give a nominal loading of 20 wt % platinum, and 0.28 g nickel as a 2 wt % aqueous nickel chloride solution. After refluxing for 2.5 hrs the resulting slurry was filtered and washed with demineralised water until no chloride was detectable in the washings. The catalyst was dried at 105° C. in air and then re-slurried in 1 liter of demineralized water for one hour at ambient temperature. 1.16 g tungsten as an aqueous solution of sodium tungstate was prepared at 1 wt %, and passed through an exchange column, comprising Dowex 50-X8 ion exchange resin to convert to colloidal tungstic acid, directly into the slurry. The slurry was then stirred for two hours, filtered and dried. The resulting catalyst (nominal atomic ratio of Pt:Ni:W of 65:15:20) was then heated to 900° C. in flowing 5% hydrogen in nitrogen to ensure reduction and alloying of the components. X-ray diffraction analysis of the fired catalyst showed a single platinum based cubic phase with a reduced lattice parameter of 3.892 Å compared to 3.925 Å for pure platinum indicating a high level of incorporation of the Ni and W components into the Pt lattice.

EXAMPLE 4

A catalyst containing platinum, manganese and tungsten was prepared. The method of example 3 was followed, but replacing 2 wt % aqueous nickel chloride solution with 0.26 g manganese as a 2 wt % aqueous manganese nitrate hexahydrate solution. X-ray diffraction analysis of the fired catalyst (nominal atomic ratio of Pt:Mn:W of 65:15:20) showed a single platinum based cubic phase. Absence of other crystalline phases and other evidence such as cyclic voltammetry indicated that an alloyed phase was present.

EXAMPLE 5

A catalyst containing platinum, ruthenium and niobium was prepared. Cabot Vulcan XC72R carbon (14.94 g) was suspended in refluxing demineralized water (6 liters) and a stoichiometric quantity of potassium hydrogen carbonate (50 g) dissolved in the suspension to ensure complete hydrolysis and precipitation of the metal oxides/hydroxides onto the carbon and additionally the removal of solvating hydrochloric acid. To the suspension were added a mixed solution comprising 4 g platinum as a 2 wt % aqueous chloroplatinic acid solution, sufficient to give a nominal loading of 20 wt % platinum, and 0.47 g ruthenium as a 2 wt % aqueous ruthenium(III) chloride solution, immediately followed by addition of 0.59 g niobium as a solution of 2 wt % niobium chloride solution (to give a nominal atomic ratio of 65:15:20). The niobium chloride solution was prepared by initial solution of the chloride in a minimum volume of concentrated hydrochloric acid (10 ml 27M HCl), and then dropwise addition of demineralized water until the hydrous oxide gel precipitate was redissolved. The volume was then made up with further addition of demineralized water. After refluxing for 2.5 hrs the resulting slurry was filtered and washed with demineralised water until no chloride was detectable in the washings. The catalyst was dried at 105° C. in air and the resulting catalyst was heated to 900° C. in flowing 5% hydrogen in nitrogen to ensure reduction and alloying of the components. X-ray diffraction analysis of the fired catalyst showed a single platinum based cubic phase with a reduced lattice parameter of 3.919 Å compared to 3.925 Å for pure platinum indicating a high level of incorporation of the Ru and Nb components into the Pt lattice.

TABLE I

Assay and XRD Characterisation Data

| Example Number | Catalyst | Assay/wt % (of the total catalyst weight, including XRD carbon support) | | | Atomic ratio | parameters a/Å |
|---|---|---|---|---|---|---|
| | | Pt | $2^{nd}$ metal | $3^{rd}$ metal | | |
| Comp. 1 | Pt | 18.9 | — | — | 100:0 | 3.925 |
| Comp. 2 | PtRu | 19.2 | 9.1 | — | 52:48 | 3.877 |
| Comp. 3 | PtRuWO$_3$ | 15.2 | 7.2 | 20.9 | 30:27:43 | 3.876 |
| 1 | PtCoW | 14.2 | 1.00 | 3.76 | 66:15:19 | 3.900 |
| 2 | PtCoMo | 20.3 | 1.44 | 0.65 | 77:18:5 | 3.868 |
| 3 | PtNiW | 20.0* | 1.39* | 5.80* | 65:15:20** | 3.892 |
| 4 | PtMnW | 20.0* | 1.30* | 5.80* | 65:15:20** | 3.927 |
| 5 | PtRuNb | 20.0* | 2.39* | 2.93* | 65:15:20** | 3.919 |

*Nominal metal loadings
**Nominal atomic ratios.

The "specific activity" of catalysts of the invention was determined by the evaluation of gas-diffusion electrodes, using a liquid electrolyte half cell, the electrodes having first been coated in a layer of proton conducting polymer. A filter transfer method, as commonly practised in the art, was used to deposit a mixture of the electrocatalyst and polytetrafluoroethylene (PTFE) onto a pre-teflonated conducting carbon fibre paper (eg Stackpole PC206). The electrode was dried and sintered at 350° C. in air. The electrode was then coated with a solubilised form of the perfluorinated membrane Nafion® EW1100 (as commercially available from Solution Technology Inc. of Mendenhall, Pa., USA., and contained as a 5 wt % solution in an essentially organic solvent of lower aliphatic alcohols with approximately 18% water).

The electrodes were evaluated in a liquid electrolyte half cell arrangement. The half cell consisted of a holder for the test electrode with the provision for the supply of reactant gases at atmospheric pressure to the back face of the electrode, a Pt foil counter electrode, and a reference electrode compartment equipped with a Luggin capillary placed close to the surface of the test electrode. The liquid electrolyte used was 1M $H_2SO_4$ and the cell was heated to 80° C.

The "fuel cell performance" of selected anode catalysts were also evaluated as the anode in a complete PEMFC single cell. The selected catalyst is incorporated into the anode which is formed into an MEA. The electrodes of the MEAs were prepared as described in Example 2 of EP 0731520. The MEA was fabricated by hot pressing the anode and a pure platinum catalyst cathode (with a platinum loading of 0.6 mg Pt/cm$^2$) against each face of a solid proton conducting electrolyte membrane. The membrane used was the perfluorinated membrane Nafion® 115 (from du Pont de Nemours). The MEAs were formed by hot pressing at pressures of 400 psi (1 psi=6.89×10 3 N/m$^2$) over the MEA, at temperatures exceeding the glass transition temperature of the membrane, as is commonly practised in the art. The MEAs were evaluated in a PEMFC single cell which consists of graphite plates into which flowfields are machined to distribute reactant gases, humidification water and heating or cooling water and to remove products. The MEA is located between the appropriate flowfield plates. The cell is compressed typically to a gauge pressure of 70 psig above the reactant gas pressure.

The "fuel cell performance" was assessed by measuring the voltage and current density relationship. The fuel cell operated under conditions representative of those employed in practical PEM fuels cells. These conditions were typically a reactant gas inlet temperature of 80° C., a pressure of both hydrogen and air reactants of 3 atmospheres, and a reactant stoichiometry for hydrogen of 1.5 and air of 2.0. For the single cell reformate tolerance experiments, the anode gas stream was changed at time t=0 from pure hydrogen to hydrogen with small impurities of CO. The cell potential was then monitored with time in order to assess the CO tolerance of different catalysts under practical conditions.

BRIEF DESCRIPTION OF THE DRAWINGS

FIG. 1 compares the CO tolerant activity of Examples 1 and 2 of the invention with Comparative Examples 1, 2 and 3. As can be seen, pure Pt is poorly resistant to poisoning with CO as demonstrated by the half-cell anode potential increasing rapidly. The PtRu and PtRuWO$_3$ do show significantly enhanced poisoning to CO compared to pure Pt on a specific activity basis. However, the half cell data of electrodes fabricated with catalysts of Example 1 and Example 2 show that much higher specific activities are obtained over the whole range of anode potentials, indicative of a much higher level of CO tolerance of the catalysts of the invention.

FIG. 2 compares the CO tolerant activity of Examples 3 and 4 of the invention with Comparative Examples 1, 2 and 3. As can clearly be seen, the half cell data of electrodes fabricated with catalysts of Example 3 and Example 4 show that much higher specific activities are obtained over the whole range of anode potentials, indicative of a much higher level of CO tolerance of the catalysts of the invention, than for electrodes fabricated with catalysts of Comparative Examples 1, 2 or 3.

FIG. 3 shows fuel cell performance data of cell voltage vs time for operation of Pt, PtRu and PtNoCo catalysts in hydrogen containing 12 ppm CO. The anode platinum loadings are respectively 0.37, 0.34 and 0.32 mg $Pt/cm^2$. FIG. 3 shows that the single cell voltages for the three MEAs employing Pt, PtRu and PtCoMo anodes were all very similar at t=0, ie in the presence of pure hydrogen fuel. The cell voltage of the Pt catalyst decayed very rapidly to a cell voltage of only 0.45 volts after introduction of 12 ppm CO into the hydrogen fuel at t=0. The current state-of-the-art CO tolerant catalyst decayed much less to a cell voltage of 0.6 Volts, but this still represents a loss of some 70–80 mV from the pure hydrogen cell voltage and would in a practical stack represent an unacceptable loss in fuel cell efficiency. However, with the anode employing the PtCoMo catalyst of the invention, the cell voltage in the presence of 12 ppm CO shows a much lower decline to 0.635 volts and clearly demonstrates that the higher intrinsic tolerance of the catalyst of the invention translates to a practical benefit in a full size fuel cell.

Figure 1:
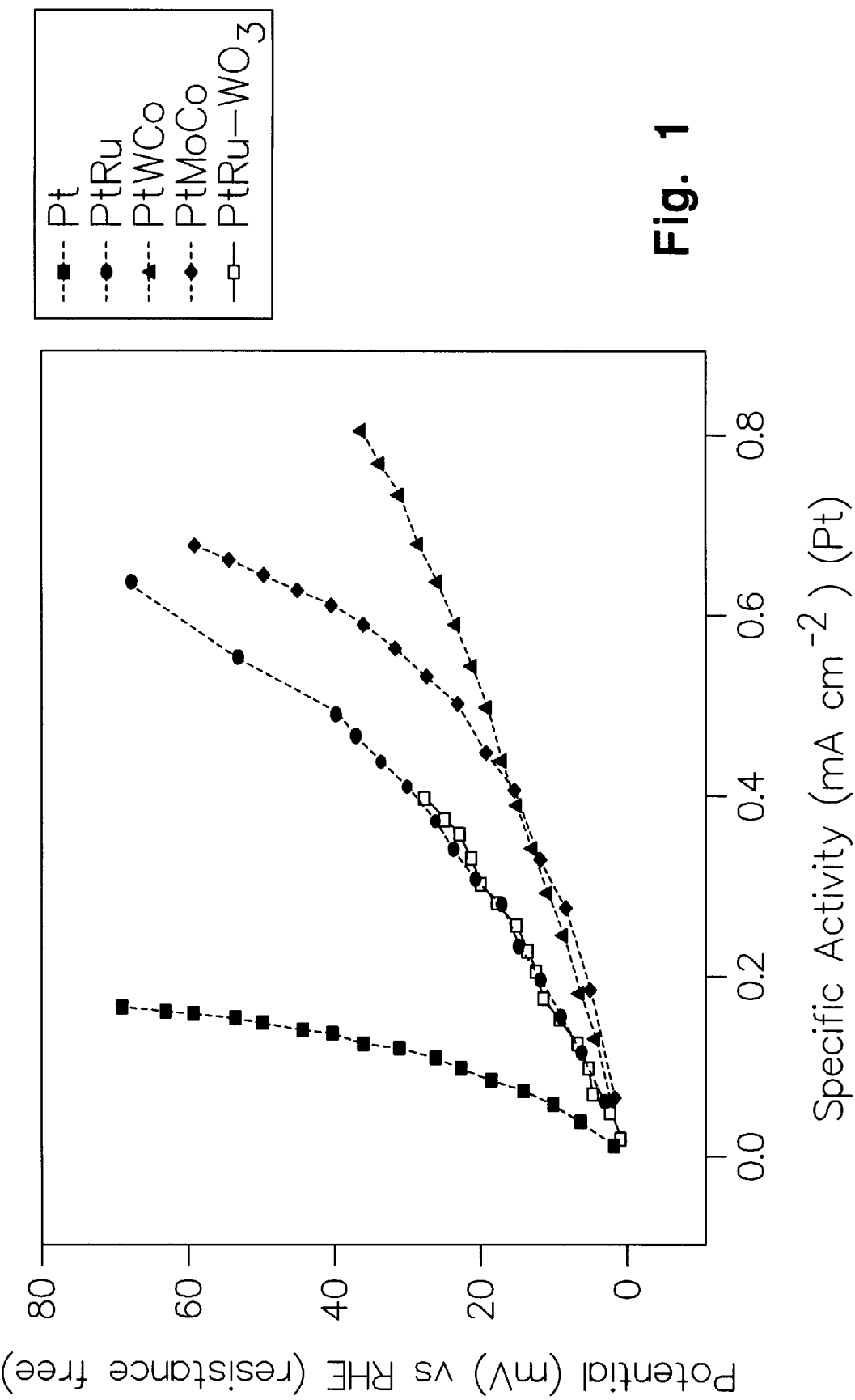
FIGS. 1 and 2 show the half cell activities of a series of electrodes containing a range of catalysts, as assessed by measuring the anode potential or voltage (corrected for internal resistance) and current density relationship (corrected for the actual Pt surface area available for reaction in the electrode, and expressed as mA/cm$^2$ Pt surface area, as measured using an in-situ CO adsorption/stripping voltammetry technique as commonly practised). This form of performance plot, is usually termed a specific activity plot. The half cell was operating using a reactant gas composition of hydrogen fuel containing 100 ppm carbon monoxide (CO). The specific activity of several catalysts is illustrated.
Figure 2:
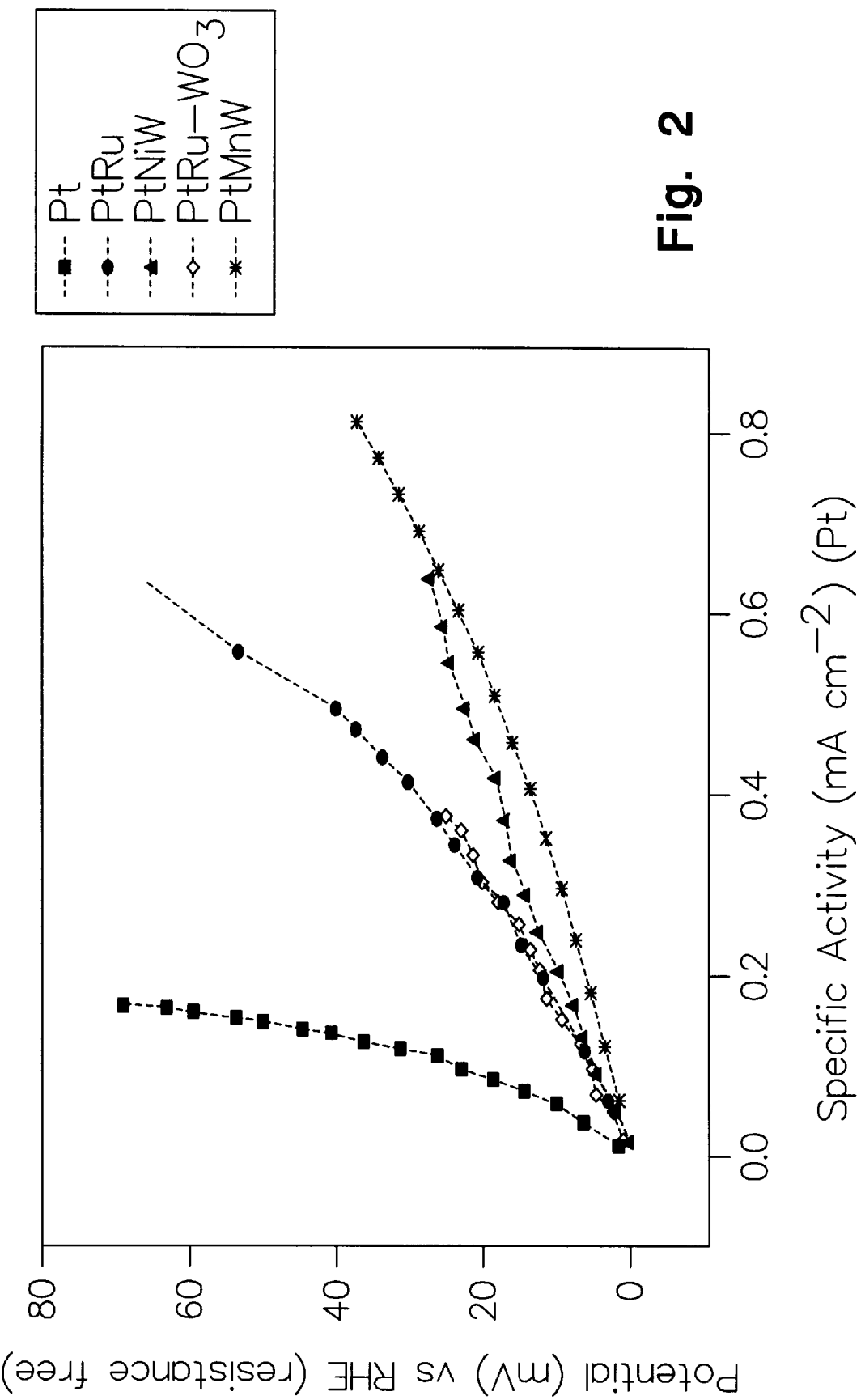

We claim:

1. A catalyst comprising platinum, a component M, and a component Y, wherein:
   the platinum and component M form a Pt—M alloy, and the Pt—M alloy and component Y are in intimate contact;
   M is one or more metals selected from the group consisting of Transition Metals, Group IIIA metals, and Group IVA metals; and
   Y is selected from the group consisting of Mo, W and oxides thereof, provided that when Y is $WO_3$, then M is other than Ru.

2. A catalyst according to claim 1, wherein M is one or more metals selected from groups WB, VB, VIB, VIIB, VIII, IB, IIB, IIIA and IVA of the Periodic Table.

3. A catalyst according to claim 1, wherein M is one or more metals selected from the group consisting of Ru, Rh, Ti, Cr, Mn, Fe, Co, Ni, Cu, Ga, Zr, Hf, and Sn.

4. A catalyst according to claim 1, wherein M is one or more metals selected from the group consisting of Ru, Mn, Co, Ni, and Rh.

5. A catalyst according to claim 1, wherein M is other than ruthenium.

6. A catalyst according to claim 1, wherein M is two or more metals and one of said metals is ruthenium.

7. A catalyst comprising a Pt—Ru alloy, which is further alloyed with tungsten.

8. An electrode comprising the catalyst according to claim 1.

9. An electrochemical device, comprising an electrode according to claim 8.

10. An electrochemical device according to claim 9, which is a fuel cell, an electrolyser, or a sensor.

11. A fuel cell comprising an electrode according to claim 8.

12. A fuel cell comprising an electrode according to claim 8 wherein the electrode is an anode.

13. A catalyst according to claim 1, wherein the platinum-M alloy comprises atoms of the component M incorporated into the crystal lattice of the platinum.

14. A catalyst according to claim 13, wherein the crystal lattice further comprises atoms of the component Y.

15. A catalyst according to claim 13, wherein the crystal lattice is in physical contact with component Y.

16. A catalyst comprising a Pt—Ru alloy, which is in intimate contact with a component Y wherein Y is selected from the group consisting of molybdenum and molybdenum oxide.

17. A catalyst comprising a Pt—Ru alloy and a second metal M, which is further alloyed with tungsten.

18. A catalyst comprising a Pt—Ru alloy and a second metal M, which is in intimate contact with a component Y wherein Y is selected from the group consisting of bronze forming elements and oxides thereof, other than tungsten and tungsten oxide.

19. A catalyst comprising platinum, a component M, and a component Y, wherein: the platinum and component M form a Pt—M alloy, and the Pt—M alloy and component Y are in intimate contact;
   M is two or more metals selected from the group consisting of Transition Metals, Group IIIA metals, and Group IVA metals and wherein one of said metals is ruthenium; and Y is selected from the group consisting of bronze forming elements and oxides thereof provided that when Y is $WO_3$, then M is other than ruthenium.

20. A catalyst according to claim 19, wherein M is two or more metals selected from groups IVB, VB, VIB, VIIB, VIII, IB, IIB, IIIA and IVA of the Periodic Table and wherein one of said metals is ruthenium.

21. A catalyst according to claim 19, wherein M is two or more metals selected from the group consisting of Ru, Rh, Ti, Cr, Mn, Fe, Co, Ni, Cu, Ga, Hf, and Sn and wherein one of said metals is ruthenium.

22. A catalyst according to claim 19, wherein M is two or more metals selected from the group consisting of Ru, Mn, Co, Ni, and Rh and wherein one of said metals is ruthenium.

23. A catalyst according to claim 19, wherein Y is one or more elements selected from the group consisting of Group IVB, VB and VIB elements, rhenium, and oxides thereof, other than chromium and its oxide.

24. A catalyst according to claim 19, wherein Y is selected from the group consisting of Ti, V, Nb, Ta, Mo, W, Re, and oxides thereof.

25. A catalyst according to claim 19, wherein Y is selected from the group consisting of Ti, V, Ta, Mo, W and oxides thereof.

26. A catalyst according to claim 19, wherein Y is selected from the group consisting of Mo, W, and oxides thereof.

27. An electrode comprising the catalyst according to claim 19.

28. A fuel cell comprising an electrode according to claim 27.

29. A fuel cell comprising an electrode according to claim 27, wherein the electrode is an anode.

30. An electrochemical device, comprising an electrode according to claim 27.

31. An electrochemical device according to claim 30, which is a fuel cell, an electrolyser, or a sensor.

32. A catalyst according to claim 19 wherein the platinum-M alloy comprises atoms of the component M incorporated into the crystal lattice of the platinum.

33. A catalyst according to claim 32 wherein the crystal lattice further comprises atoms of the component Y.

34. A catalyst according to claim 32, wherein the crystal lattice is in physical contact with component Y.

* * * * *

UNITED STATES PATENT AND TRADEMARK OFFICE
CERTIFICATE OF CORRECTION

PATENT NO. : 5,939,220
DATED : August 17, 1999
INVENTOR(S) : Gunner, et. al.

It is certified that error appears in the above-identified patent and that said Letters Patent is hereby corrected as shown below:

On the Cover Page:

Under "Foreign Application Priority Data", delete "96222284"
and insert therefor --9622284.9 --

Under "References Cited", "U.S. PATENT DOCUMENTS", add
--5,126,216    6/1992    Capuano et al.    429/40
4,696,731    9/1987    Tenhover    204/290R--;

and under "FOREIGN PATENT DOCUMENTS" (Column 2, second reference
from the last) delete "6/1986" as the date and insert therefor --6/1967--.

Column 2, line 29, delete "oxidi sing" and insert therefor --oxidising--.

Column 7, in Table 1, line, 44, after "including" delete "XRD";
line 45, delete "para-" and replace it with --XRD--,
line 46, insert --para--- above "meters" in line 47.

Column 9, line 12, delete "PtNoCo" and insert therefor --PtMoCo--.

Claim 2, Column 9, line 43, after "groups", delete "WB" and insert
therefor --IVB--.

Signed and Sealed this

Seventh Day of March, 2000

*Attest:*

*Attesting Officer*

Q. TODD DICKINSON

*Commissioner of Patents and Trademarks*